United States Patent [19]

Sundermann et al.

[11] 4,066,577

[45] Jan. 3, 1978

[54] HIGH MOLECULAR WEIGHT POLYTRIAZINES OF SOLUBLE POLYMERIC N-CYANO-ISOUREA ETHERS

[75] Inventors: Rudolf Sundermann, New Martinsville, W. Va.; Gunther Rottloff, Cologne; Ernst Grigat, Odenthal-Gloebusch, both of Germany

[73] Assignee: Bayer Aktiengesellschaft, Germany

[21] Appl. No.: 707,543

[22] Filed: July 22, 1976

[30] Foreign Application Priority Data

July 24, 1975  Germany .............................. 2533119

[51] Int. Cl.² ............................................ C08G 73/08
[52] U.S. Cl. .................... 260/2 R; 260/47 R; 260/59 R; 260/65; 260/79.3 R; 260/551 C; 428/411
[58] Field of Search .................. 260/2 R, 47 R, 59 R, 260/65, 79.3 R

[56] References Cited

U.S. PATENT DOCUMENTS

| | | | |
|---|---|---|---|
| 3,130,224 | 4/1964 | Sugino et al. | 260/551 |
| 3,308,101 | 3/1967 | Ikeda | 260/78.4 |
| 3,694,408 | 9/1972 | Hynds et al. | 260/47 R |

*Primary Examiner*—Harold D. Anderson
*Assistant Examiner*—E. A. Nielsen
*Attorney, Agent, or Firm*—Connolly and Hutz

[57] ABSTRACT

High molecular weight temperature-resistant polymers of polytriazine structure obtained by heating cyanamides of the formula I $$R - (NH-CN)_n$$

in which R represents an aliphatic, cycloaliphatic, heterocyclic or aromatic radical, optionally interrupted by oxygen and $n$ is a number from 2 to 5, with polyfunctional, aromatic cyanic acid esters into a fusible or in organic solvents soluble polymeric N-cyano-isourea ether and completing the reaction at elevated temperatures and optionally in the presence of a catalyst to form said polymer of polytriazine structure.

5 Claims, No Drawings

HIGH MOLECULAR WEIGHT POLYTRIAZINES OF SOLUBLE POLYMERIC N-CYANO-ISOUREA ETHERS

This invention relates to high molecular weight polytriazines and to a process for their production by heat treating soluble, polymeric N-cyano-isourea ethers which in turn have been obtained by the polyaddition of mixtures of difunctional or polyfunctional cyanamides and difunctional or polyfunctional aromatic cyanic acid esters.

It is known from DT-PS 1,190,184 that high molecular weight polytriazines can be obtained by polymerising difunctional or polyfunctional aromatic cyanic acid esters at an elevated temperature, optionally in the presence of polymerisation promoters.

In addition, it is known from Japanese Application JA 2665/66 that primary diamines can be reacted with cyanogen halide to form di(cyanamides) which may be processed into polymers.

The polymerisation of polyfunctional cyanamides of secondary amines with catalytic to more than molar quantities of mono- or poly-hydroxyl and/or thiol compounds at temperatures of from 50° to 250° C to form polymeric products, is also known, cf. DT-OS 1,595,651.

Finally, a process for the production of macromolecular polyguanidines by reacting N,N'-dicyanamides of the formula NC-NH-R-NH-CN on their own or with an N,N'-dicyanamide of the formula NC-NR'-R-NR'CN (where R and R' represent hydrocarbon radicals), is known from NE-PS 55 826.

It has now been found that high molecular weight polytriazines can be obtained by converting cyanamides corresponding to the general formula (I):

$$R(NH-CN)_n \quad (I)$$

in which R represents an aliphatic, cycloaliphatic, heterocyclic or aromatic radical optionally interrupted by oxygen, and $n$ is a number from 2 to 5. with aromatic cyanic acid esters corresponding to the general formula (II):

$$Ar(OCN)_p \quad (II)$$

in which Ar represents an aromatic radical or an aromatic radical interrupted by bridge members, and $p$ is a number from 2 to 5,
at an elevated temperature into a prepolymer soluble in organic solvents or into a fusible prepolymer (polymeric N-cyano-isourea ether), and allowing the prepolymer to react to completion at elevated temperatures and optionally in the presence of a catalyst to form a high molecular weight polymer of polytriazine structure which is substantially insoluble in solvents.

It is preferred to react from 30 to 70 mol % of the cyanamides of formula (I) with from 70 to 30 mol % of the aromatic cyanic acid esters of formula (II).

The invention also relates to mixtures which can be converted into high molecular weight polymers of polytriazine structure which are substantially insoluble in organic solvents, consisting of A. cyanamides corresponding to the general formula (I):

$$R(NH-CN)_n \quad (I)$$

in which R represents an aliphatic, cycloaliphatic, heterocyclic or aromatic radical optionally interrupted by oxygen atoms,
and $n$ is a number from 2 to 5, and B. aromatic cyanic acid esters corresponding to the general formula (II):

$$Ar(OCN)_p \quad (II)$$

in which Ar represents an aromatic radical or an aromatic radical interrupted by bridge members, and $p$ is a number from 2 to 5.

The mixtures preferably consist of from 30 to 70 mol % of cyanamides corresponding to the formula (I) and from 70 to 30 mol % of aromatic cyanic acid esters corresponding to the formula (II).

In the formula (I), R preferably represents an aliphatic radical with from 2 to 12 carbon atoms or an aliphatic radical with from 2 to 12 carbon atoms substituted by $C_1$-$C_4$ alkyl or phenyl; a cycloaliphatic radical with from 5 to 12 carbon atoms; a cycloaliphatic radical with from 5 to 12 carbon atoms which is interrupted by oxygen, by the sulphonyl group ($SO_2$), by the carbonyl group (CO) or by a linear or branched alkylene group with from 1 to 9 carbon atoms, more especially with from 1 to 4 carbon atoms; a cycloaliphatic radical with from 5 to 12 carbon atoms which is substituted by halogen, more especially chlorine, linear or branched $C_1$-$C_4$ alkyl, by alkoxy with from 1 to 4 carbon atoms, or by alkoxy carbonyl (—$CO_2R$; R = $C_1$-$C_4$ alkyl); a cycloaliphatic radical with from 5 to 12 carbon atoms which is interrupted by oxygen, the sulphonyl group, the carbonyl group or by a linear or branched alkylene group with from 1 to 4 carbon atoms and which is substituted by halogen, more especially chlorine, linear or branched $C_1$-$C_4$ alkyl, by alkoxy with from 1 to 4 carbon atoms, or by alkoxy carbonyl (—$CO_2R$; R = $C_1$-$C_4$ alkyl); a radical corresponding to the formula (III):

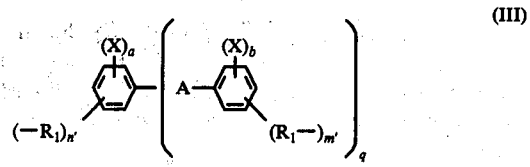

(III)

in which $R_1$ represents a single bond, an alkylene group with from 1 to 9 carbon atoms, an alkylene group with from 1 to 9 carbon atoms substituted by $C_1$-$C_4$ alkyl or phenyl, an alkyleneoxy group with from 2 to 4 carbon atoms, X = hydrogen, halogen, linear or branched $C_1$-$C_9$ alkyl, phenyl or two adjacent alkyl radicals on the same nucleus together form a carbocyclic 5-membered or 6-membered ring, or together and in conjunction with a hetero atom (O, S or N) form a 5-membered or 6-membered heterocyclic ring, alkoxy radicals with from 1 to 4 carbon atoms, alkoxy carbonyl radicals with from 1 to 4 carbon atoms in the alkyl group, A = a single bond, oxygen, the sulphonyl group (—$SO_2$—), the carbonyl group (—CO—), the carbonyl dioxy group

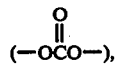

an alkylene group with from 1 to 9 carbon atoms optionally substituted by $C_1$-$C_4$ alkyl or phenyl, a cycloaliphatic or aromatic 5-membered or 6-membered ring, and $n'$ = a number from 0 to 5 where $q = 1$ and a number from 2 to 5 where $q = 0$, $a = 5 - n'$ where $q = 1$ and $6 - n'$ where $q = 0$, $m'$ = a number from 0 to 5, $b = 5 - m'$, $q = 0$ or 1, with the proviso that the sum of $n'$ and $m'$ gives a number from 2 to 5, and where $q = 0$ the bracketed group is replaced by X.

In particular, R in formula (I) has the following meanings:

a linear or branched alkylene radical with from 2 to 6 carbon atoms a cycloaliphatic radical with 6, 10 or 12 carbon atoms, a hydrogenated diphenyl ether, diphenyl ketone, diphenyl sulphone, diphenyl methane, or diphenyl propane radical which may be substituted by chlorine, methyl, ethyl or propyl, methoxy, ethoxy, propoxy, methoxy carbonyl, ethoxy carbonyl or propoxy carbonyl;

a radical of the formula (III) in which $R_1$ is a single bond, an alkylene group with from 1 to 4 carbon atoms, an ethyleneoxy- ($-CH_2CH_2-O-$) or propyleneoxy group, X = hydrogen, chlorine, $C_1$-$C_4$ alkyl, methoxy, ethoxy, methoxy carbonyl, ethoxy carbonyl or butoxy carbonyl group, A = a single bond, oxygen, the sulphonyl group, the carbonyl groups, the methylene, ethylene, propylene or a 2,2-propylene group

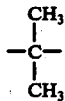

$n'$ = the number 0 or 1, more especially the number 1, where $q = 1$ and the number 2 where $q = 0$, $a$ = the number 1 or 2, more especially the number 1, $m'$ = the number 0, 1 or 2, more especially the number 1, $b$ = the number 1 or 2, more especially the number 1, and $q$ = the number 0 or 1, with the proviso that $n' + m' = 2$ and where $q = 0$ the bracketed group is replaced by X.

The following compounds for example correspond to the general formula (I):

tetramethylene dicyanamide,
pentamethylene dicyanamide,
hexamethylene dicyanamide,
heptamethylene dicyanamide,
octamethylene dicyanamide,
nonamethylene dicyanamide,
decamethylene dicyanamide,
2,5-di-N-cyanamido-2,5-dimethyl hexane,
2,2,4-trimethyl hexamethylene dicyanamide,
2,4,4-trimethyl hexamethylene dicyanamide,
1,3-dicyanamidocyclohexane,
1,4-dicyanamidocyclohexane,
1,3-dicyanamidocyclohexane,
1,3-dicyanamido-4-methyl cyclohexane,
1-cyanamidomethyl-5-cyanamido-1,3,3-trimethyl cyclohexane,
4,4'-di-N-cyanamidodicyclohexyl methane,
4,4'-di-N-cyanamido-3,3'-dimethyl dicyclohexyl methane,
1,3-di-N-cyanamidobenzene,
1,4-di-N-cyanamidobenzene,
1,3-di-N-cyanamido-4-chlorobenzene,
1,4-di-N-cyanamido-3-chlorobenzene,
1,3-di-N-cyanamido-4-methyl benzene,
1,4-di-N-cyanamido-3-methyl benzene,
m-xylylene dicyanamide,
p-xylylene dicyanamide,
1,4-, 1,5-, 2,7-di-N-cyanamidonaphthalene,
2,2'-dichloro-4,4'-di-N-cyanamidodiphenyl,
3,3'-dichloro-di-N-cyanamidodiphenyl,
4,4'-di-N-cyanamidodiphenyl methane,
3,3'-dichloro-4,4'-di-N-cyanamidodiphenyl methane,
3,3'-dimethyl-4,4-di-N-cyanamidodiphenyl,
2,2-bis-(4-cyanamidophenyl)-propane,
1,1-bis-(4-cyanamidophenyl)-cyclohexane,
4,4'-di-N-cyanamidodiphenyl ether,
4,4'-di-N-cyanamidodiphenyl sulfide,
4,4'-di-N-cyanamidodiphenyl sulfone and
2,4,4'-tri-N-cyanamidodiphenyl ether.

The production of the cyanamides used in accordance with the invention is known. Thus, the cyanamides may be produced for example in accordance with R. Kitawaki, M. Yomashita, K. Sugino, J. Chem. Soc. Japan, 78, 567 (1957), or K. Sugino, K. Shirai, R. Kitawaki, J. Org. Chem. 26, 4122 (1960), or in accordance with U.S. Pat. No. 3,308,101 and GB-PS 1,009,891.

The aromatic cyanic acid esters of the formula (II) used in accordance with the invention are known compounds, for example from GB-PS 1,007,790, and may be produced by the process described therein.

From 1 to 1.1 moles of cyanogen halide and 1 mole of a base or base mixture may be used per phenolic hydroxyl group. The reaction temperatures are in the range of from $-40°$ C to $+65°$ C. Suitable bases are inorganic bases, such as sodium hydroxide, potassium hydroxide, soda, potash, or calcium hydroxide, or tertiary amines such as trimethylamine or triethylamine, whilst suitable solvents or suspending agents are water, alcohols, ketones, hydrocarbons, chlorinated hydrocarbons or mixtures thereof.

The aromatic cyanic acid esters preferably correspond to the general formula (IV):

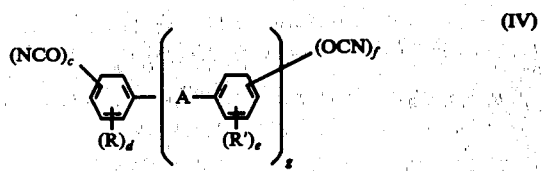

in which R represents hydrogen, halogen, linear or branched $C_1$-$C_9$ alkyl or phenyl, several radicals R not having to be the same; or two adjacent radicals R on the same nucleus together form a carbocyclic 5-membered or 6-membered ring, or together and in conjunction with hetero atoms (O, S or N) form a 5-membered or 6-membered heterocyclic ring; alkoxy radicals with from 1 to 4 carbon atoms, or alkoxy carbonyl radicals with from 1 to 4 carbon atoms in the alkyl group; R' has the same meaning as R or represents the group (V):

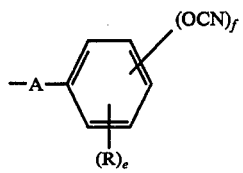

A = a single bond; an alkylene group with from 1 to 9 carbon atoms, optionally substituted by $C_1$–$C_4$ alkyl or phenyl; a cycloaliphatic or aromatic 5-membered or 6-membered ring optionally interrupted by oxygen; oxygen; the sulphonyl group ($-SO_2-$); the carbonyl group ($-CO-$); or the carbonyl dioxy group

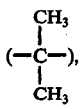

$c$ = a number from 0 to 5 where $g$ = 1 and a number from 2 to 5 where $g$ = 0,
$d$ = 5 − $c$ where $g$ = 1 and 6 −($c$ + $f$) where $g$ = 0,
$e$ = 5 − $f$,
$f$ = a number from 0 to 5, and
$g$ = 0 or 1,
with the proviso that the sum of $c$ and $f$ always gives a number from 2 to 5.

In particular, the symbols in formula (IV) have the following meanings:
R = hydrogen, chlorine or bromine, $C_1$–$C_4$ alkyl, methoxy, ethoxy, methoxy carbonyl, ethoxy carbonyl or butoxy carbonyl,
A = a single bond, oxygen, the sulphonyl group, the carbonyl group, the carbonyl dioxy group, the methylene group, ethylene group, the 2,2-propylene group

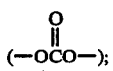

or the cyclohexylene radical; $c$ = the number 0 or 1, more especially the number 1, where $g$ = 1 and the number 2 where $g$ = 0,
$d$ = the number 1 or 2, more especially the number 1,
$e$ = the number 1 or 2, more especially the number 1,
$f$ = the number 0, 1 or 2, more especially the number 1, and
$g$ = the number 0 or 1,
with the proviso that $c + f = 2$.

The following are mentioned as examples of compounds corresponding to the formula (II):

the di- and poly-cyanic acid esters,
1,3- and 1,4-dicyanatobenzene,
2-tert.-butyl-1,4-dicyanatobenzene,
2,4-dimethyl-1,3-dicyanatobenzene,
2,5-di-tert.-butyl-1,4-dicyanatobenzene,
tetramethyl-1,4-dicyanatobenzene,
2,4,6-trimethyl-1,3-dicyanatobenzene,
4-chloro-1,3-dicyanatobenzene,
1,3-, 1,4-, 1,5-, 1,6-, 1,7-, 1,8-, 2,6-, 2,7-dicyanatonaphthalene and
1,3,5-tricyanatobenzene;
4,4'-dicyanatodiphenyl,
2,2'-dicyanatodiphenyl,
3,3',5,5'-tetramethyl-4,4'-dicyanatodiphenyl,
3,3'-, 5,5'-tetrachloro-4,4'-dicyanatodiphenyl,
3,3', 5,5'-tetrachloro-2,2'-dichanatodiphenyl,
2,2', 6,6'-tetrachloro-4,4'-dicyanatodiphenyl,
4,4'-bis-[(3-cyanato)-phenoxy]-diphenyl,
4,4'-bis-[(4-cyanato)-phenoxy]-diphenyl; and
2,2'-dicyanato-1,1'-binaphthyl;
4,4'-dicyanatodiphenyl ether,
3,3',5,5'-tetramethyl-4,4'-dicyanatodiphenyl ether,
3,3',5,5'-tetrachloro-4,4'-dicyanatodiphenyl ether,
4,4'-bis-[p-cyanatophenoxy]-diphenyl ether,
4,4'-bis-[p-cyanatophenyl isopropyl]-diphenyl ether,
4,4'-bis-[p-cyanatophenoxy]-benzene,
4,4'-bis-[m-cyanatophenoxy]-diphenyl ether and
4,4'-bis-[4-(4-cyanatophenoxy)-phenyl sulfone]-diphenyl ether;
4,4'-dicyanatodiphenyl sulfone,
3,3',5,5'-tetramethyl-4,4'-dicyanatodiphenyl sulfone,
3,3',5,5'-tetrachloro-4,4'-di-cyanatodiphenyl sulfone,
4,4'-bis-[p-cyanatophenyl isopropyl]-diphenyl sulfone,
4,4'-bis-[(4-cyanato)-phenoxy]-diphenyl sulfone,
4,4'-bis-[(3-cyanato)-phenoxy]-diphenyl sulfone,
4,4'-bis[4-(4-cyanatophenyl isopropyl)-phenoxy]-diphenyl sulfone,
4,4'-bis-[4-(4-cyanatophenyl isopropyl)-phenoxy]diphenyl sulfone,
4,4'-bis-[4-(4-cyanato)-diphenoxy]diphenyl sulfone;
4,4'-dicyanatodiphenyl methane, 4,4'-bis-[P-cyanatophenyl]diphenyl methane,
2,2-bis-(p-cyanatophenyl)-propane,
2,2-bis-(3,5-dimethyl-4-cyanatophenyl)-propane,
2,2-bis-(3,5-dichloro-4-cyanatophenyl)-propane,
1,1-bis-[p-cyanatophenyl]-cyclohexane,
bis-[2-cyanato-1-naphthyl]-methane,
1,2-bis-[p-cyanatophenyl]1,1,2,2-tetramethyl ethane,
4,4'-dicyanatobenzophenone,
4,4'-bis-(4-cyanato)-phenoxy benzophenone,
1,4-bis-[p-cyanatophenyl isopropyl]-benzene,
2,2',5,5'-tetracyanatodiphenyl sulfone
and polycyanic acid esters of novolaks (reaction products of phenol or alkyl or halogen-substituted phenols with formaldehyde in acid solution) containing from 3 to 5 OCN-groups.

In cases where it is desired to use pure aromatic cyanic acid esters that are particularly stable in storage, it is advisable to adopt a procedure similar to that described in our copending U.S. application, Ser. Nos. 658,814 or 658,815 which relate to the production of highly pure polyfunctional cyanic acid esters. According to our copending U.S. application, Ser. No. 658,814, filed Feb. 17, 1976 di- or poly-trialkyl ammonium phenolates (for example polytriethyl-ammonium phenolates) are reacted with an excess of a cyanogen halide in an organic solvent, optionally in the presence of catalytic quantities of trialkyl amines, such as triethylamine, to form the corresponding aromatic cyanic acid esters.

According to our copending U.S. application, Ser. No. 658,815, filed Feb. 17, 1976 alkali or alkaline earth metal salts, preferably sodium, potassium, calcium and barium salts, of aromatic di- or poly-hydroxy-compounds, are reacted with cyanogen halide in a solvent, optionally in the presence of catalytic quantities of a tertiary amine.

From 1 to 2 moles and preferably from 1 to 1.4 moles of cyanogen halide and from 1 to 1.8 moles, preferably from 1 to 1.3 moles, of a base or base mixture may be used for every phenolic hydroxyl group, the base or the base mixture always being used in a deficit relative to the cyanogen halide.

Examples of suitable solvents are water; lower aliphatic alcohols such as methanol, ethanol, propanol, isopropanol or butanol; aliphatic ketones such as acetone, methylethyl ketone, diethyl ketone, methyl isopropyl ketone or methyl isobutyl ketone; aliphatic or aromatic hydrocarbons, preferred aliphatic hydrocarbons being the fractions accumulating during distillation of the naturally occurring mixtures, such as petroleum ether, light petrol or petrol, whilst examples of aromatic hydrocarbons are benzene, toluene and xylenes; aliphatic and aromatic chlorinated hydrocarbons, such as dichloromethane, dichloroethane, perchlorethylene, chlorobenzene or dichlorobenzene; ethers such as diethyl ether, diisopropyl ether, dioxane, tetrahydrofuran or di-sec.-butyl ether; nitrohydrocarbons such as nitromethane, nitrobenzene or nitrotoluene; amides such as dimethyl formamide or dimethyl acetamide; and mixtures thereof.

Suitable inorganic or organic bases are those mentioned in GB-PS 1,007,790.

These processes are generally carried out at temperatures in the range of from $-40°$ to $+65°$ C and preferably at temperatures in the range of from 0° to 30° C. In cases where cyanogen chloride is used, the reaction is preferably carried out below the boiling point (13° C), although where cyanogen bromide is used the reaction may even be carried out at temperatures above 50° C.

Tertiary amines, which are generally used in catalytic quantities (0.001 to 10% by weight), more especially 0.001 to 1.0% by weight, based on the alkali or alkaline earth phenolate) in accordance with our copending U.S. Application, Ser. No. 658,815, filed Feb. 17, 1976 correspond to the general formula:

in which
$R_1$, $R_2$, $R_3$ = alkyl, aryl and cycloalkyl radicals which do not have to be the same as one another, with from 1 to 36 carbon atoms, more especially with up to 18 carbon atoms, such as for example trimethylamine, triethylamine, methyl diethylamine, tripropylamine, tributylamine, methyl dibutylamine, dinonyl methylamine, dimethylstearylamine, dimethyl cyclohexylamine and diethyl aniline.

The process according to the invention may be explained for example by the following equation ($x > 2$), the terminal groups representing cyanamide and cyanate groups:

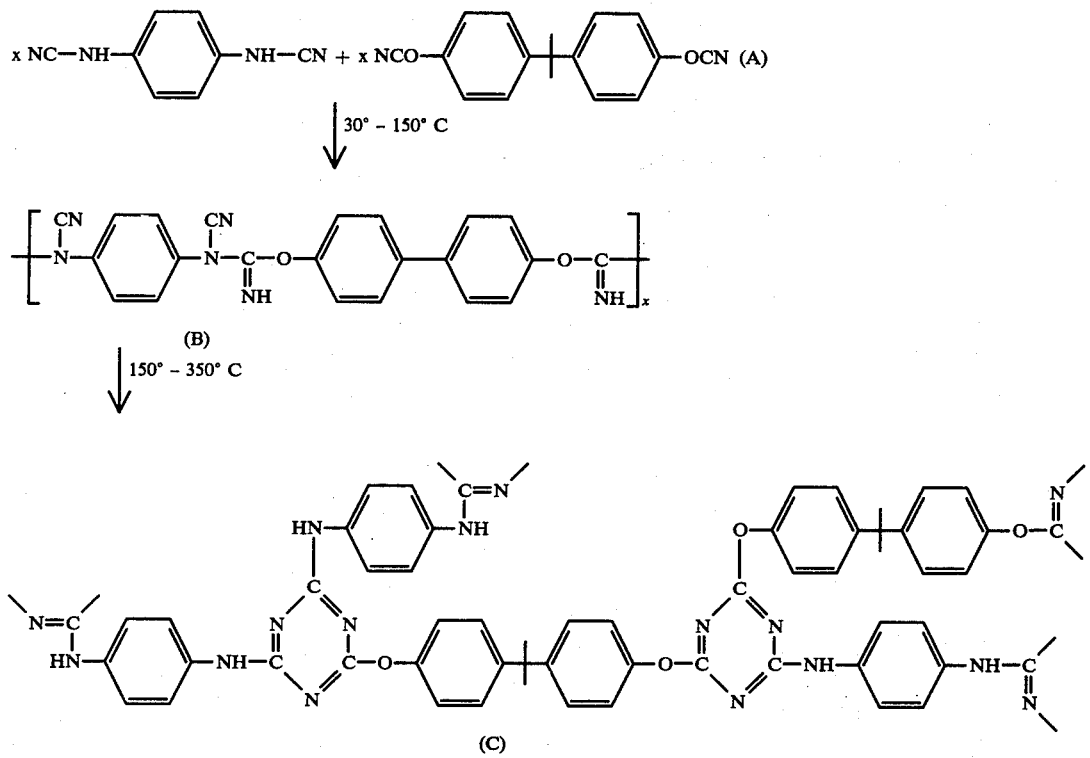

The process according to the invention may be carried out by reacting the polyfunctional cyanamides and the polyfunctional aromatic cyanic acid esters by heating to temperatures of 30° – 150° C, preferably to 50° – 100° C, optionally in solution and optionally in the presence of a catalyst or catalyst mixture, to form uncrosslinked prepolymers (B) which are soluble in organic solvents. The prepolymers represent polymeric N-cyano-isourea ethers of liquid, wax-like or solid consistency and are soluble in organic solvents. They are highly stable in storage. As shown by the IR-spectrum, they contain hardly any triazine structures, but instead show the bands of the N-C≡N group at 4.5 μ and of the C=NH group at 5.9 μ.

The prepolymers may be converted into high molecular weight polymers (C) of triazine structure by heating to temperatures of 150° – 350° C, preferably to 150° – 300° C optionally in solution and optionally in the presence of a catalyst or catalyst mixture. The end products are substantially insoluble in solvents and are infusible. As shown by the infrared spectrum, the polymer does not contain any other cross-linking principles apart from the triazine structures. The formation of the high molecular weight polymers with triazine structures indicates that cyanic acid ester and cyanamide groups have participated equally in the formation of the triazine ring.

Catalysts suitable for use in the production of the prepolymer and high molecular weight end polymer with triazine structures include acids, bases, salts, nitrogen and phosphorus compounds, for example Lewis acids such as $AlCl_3$, $BF_3$, $FeCl_3$, $TiCl_4$, $ZnCl_2$ or $SnCl_4$; proton acids such as HCl or $H_3PO_4$; aromatic hydroxy compounds such as phenol, p-nitrophenol, pyrocatechol or dihydroxy naphthalene; sodium hydroxide, sodium methylate, sodium phenolate, trimethylamine, triethylamine, tributylamine, diaza-bicyclo-(2,2,2)-octane, quinoline, isoquinoline, tetrahydroisoquinoline, tetraethyl ammonium chloride, pyridine-N-oxide, tributylphosphine, phospholine- Δ $^3$-1-oxa-1-phenyl, zinc octoate, zinc naphthenate, and mixtures thereof.

The catalyst may be used in quantities of from 0.001% by weight to 10% by weight, based on the prepolymer, or if desired in even larger quantities.

The prepolymers may be used in solution in inert solvents, such as acetone, benzene, xylene, chlorobenzene, ethylacetate, tetrahydrofuran, dibutyl ether or dimethyl formamide, or in powder form, for the production of coatings on substrates such as metals, ceramics, glass earthenware etc., or in solution in organic solvents as impregnating lacquers or laminating resins. If desired, the prepolymers may be combined with fillers, pigments, glass fibres, metal fibres and glass cloths and used for the production of shaped articles or laminates. Yellow to brown, transparent, extremely hard and temperature-resistant end products are obtained after hardening.

The percentage contents and parts quoted in the Examples relate to weight, unless otherwise indicated.

EXAMPLE 1

16.6 g (0.1 mol) of hexamethylene di-N-cyanamide and 27.8 g (0.1 mol) of bis-2,2-(4-cyanatophenyl)-propane are boiled under reflux for three hours in 150 ml of dichloroethane. A polymeric N-cyano-isourea ether having the characteristic absorption bands in the IR-spectrum:

at 4.5 μ, > C=NH at 5.9 μ, is obtained in a quantitative yield following removal of the solvent by distillation.

10 g of the polymeric N-cyano-isourea ether are heated under nitrogen for 6 hours to 290°–300° C. A very hard polymer with the IR-bands characteristic of the s-triazine ring at 6.4 μ and 7.25 μ is obtained. The bands characteristic of the starting material at 4.5 μ and 5.9 μ are no longer present in the reaction product.

EXAMPLE 2

16.6 g (0.1 mol) of hexamethylene di-N-cyanamide and 32.0 g (0.2 mol) of resorcinol dicyanate are boiled under reflux for 2 hours in 200 ml of toluene. A polymeric-N-cyano-isourea ether containing resorcinol cyanate is obtained in a quantitative yield, in the form of a pale yellow wax-like mass, following removal of the solvent by distillation. (IR-spectrum: 2-absorption bands at approximately 4.5 μ HN=C < band at 5.9 μ).

10 g of the product thus obtained are heated for 5 hours to 150° C, followed by hardening for 2 hours at 230° C. An extremely hard, light brown polytriazine with the IR-absorption bands characteristic of the s-triazine ring is obtained.

EXAMPLE 3

33.2 g (0.2 mol) of hexamethylene-di-N-cyanamide and 16.0 g (0.1 mol) of resorcinol cyanate are thoroughly mixed and carefully heated to 80°–90° C. A clear, thinly liquid melt is initially formed. After about 30 minutes, the melt becomes increasingly more viscous. After 90 minutes, a viscous mass is obtained, showing the > N-CN band at 4.5 μ and the > C=NH band at 5.9 μ in the infrared spectrum. Hardening of this prepolymer takes place over a period of 5 hours at 160° C. A hard polytriazine is obtained (s-triazine bands in the IR-spectrum at 6.4 μ and 7.25 μ).

EXAMPLE 4

24.8 g (0.1 mol) of 4,4'-di-N-cyanoamido diphenyl methane and 27.8 g (0.1 mol) of bis-2,2-(4-cyanatophenyl)-propane are boiled under reflux for 3 hours for 3 hours in isopropanol. The solvent is then distilled off in vacuo. A polymeric N-cyano-isourea ether is obtained in a quantitative yield. This prepolymer is hardened over a period of 4 hours at 170° C, giving a yellow, extremely hard polytriazine (s-triazine band at 6.4 μ and 7.5 μ).

EXAMPLE 5

28.8 g (0.1 mol) of 4,4'-di-N-cyanamido diphenyl methane and 16 g (0.1 mol) of hydroquinone dicyanate are boiled under reflux for 2.5 hours in 200 ml of methylethyl ketone. A polymeric N-cyano-isourea ether is obtained in a quantitative yield following removal of the solvent by distillation (IR: >N-C=N- band at 4.5 μ and >C=NH-band at 5.9 μ). Hardening of this prepolymer into an extremely hard polytriazine takes place over a period of 4 l hours at 170° C in the presence of 0.1% of zinc octoate.

EXAMPLE 6

24.8 g (0.1 mol) of 4,4'-di-N-cyanamido diphenyl methane and 30.0 g (0.1 mol) of 4,4'-dicyanato diphenyl sulfone are boiled under reflux for 3 hours in 300 ml of isopropanol. The solvent is then distilled off in vacuo. A polymeric N-cyano-isourea ether is obtained in a quantitative yield. Hardening of this prepolymer into an extremely hard polytriazine takes place over a period of 3 hours at 190° C in the presence of 0.1% by weight of anhydrous zinc chloride.

EXAMPLE 7

276.6 g (0.1 mol) of bis-2,2-(4-cyanamidophenyl)-propane and 27.8 g (0.1 mol) of bis-2,2-(4-cyanatophenyl)- propane are boiled under reflux for 4 hours in dichloroethane. A polymeric N-cyano-isourea ether is obtained in a quantitative yield following removal of the solvent by distillation. (IR-spectrum:

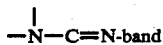

at 4.5 μ, > C=NH-Band at 5.9 μ). Hardening of this prepolymer takes place over a period of 5 hours at 250° C in the presence of 0.5% of pyrocatechol and 0.5% of diaza-bicyclo-(2,2,2)-octane.

EXAMPLE 8

26.2 g (0.1 mol) of 3,3'-dimethyl-4,4'-di-N-cyanamido diphenyl and 23.6 g (0.1 mol) of 4,4'-dicyanato diphenyl are boiled under reflux for 2 hours in 250 ml of chlorobenzene. The solvent is distilled off in vacuo. A polymeric N-cyano-isourea ether is obtained in a quantitative yield. (IR-spectrum:

at 4.5 μ, > C=NH-band at 5.9 μ). Hardening of this prepolymer into a polytriazine takes place over a period of 6 hours at 160° C in the presence of 0.1% of tin tetrachloride.

EXAMPLE 9

31.7 g (0.1 mol) of 3,3'-dichloro-4,4'-di-N-cyanamido diphenyl methane and 27.8 g (0.1 mole) of bis-2,2-(4-cyanatophenyl)-propane are boiled under reflux for 3 hours in 200 ml of isopropanol. A polymeric N-cyano-isourea ether is obtained in a quantitative yield following removal of the solvent by distillation. (IR-spectrum: band at 4.5 μ and 5.9 μ). Hardening of this prepolymer into an extremely hard polytriazine takes place over a period of 4 hours at 190° C in the presence of 0.2% by weight of zinc octoate.

EXAMPLE 10

20.8 g (0.1 mol) of 1,5-di-N-cyanamido naphthalene and 21.0 g (0.1 mol) of 1,5-dicyanato naphthalene are boiled under reflux for 4 hours in 150 ml of dichloroethane. A polymeric N-cyano-isourea ether is obtained in a quantitative yield following removal of the solvent by distillation. (IR-spectrum: > N-C=N-band at 4.5 μ; > C=NH-band at 5.9 μ).

Hardening of this prepolymer into an extremely hard polytriazine takes place over a period of 4 hours at 170° C in the presence of 0.3% by weight of zinc chloride.

EXAMPLE 11

25 g (0.1 mol) of 4,4'-di-N-cyanamido diphenyl ether and 25 g (0.09 mol) of bis-2,2-(4-cyanatophenyl)-propane are boiled under reflux for 2.5 hours in 100 ml of perchlorethylene. A polymeric N-cyano-isourea ether is obtained in a quantitative yield following removal of the solvent by distillation. This prepolymer is converted into an extremely hard polytriazine over a period of 6 hours at 180° C in the presence of 0.1% by weight of zinc octoate.

EXAMPLE 12

29.8 g (0.1 mol) of 4,4'-di-N-cyanamido diphenyl sulphone and 33.4 g (0.1 mol) of bis-2,2-(3,5-dimethyl-4-cyanatophenyl)-propane are boiled under reflux for 3 hours in 200 ml of isopropanol. A polymeric N-cyano-isourea ether is obtained in a quantitative yield following removal of the solvent by distillation. (IR-spectrum: N-C=N at 4.5 μ, C=NH at 5.9 μ). Hardening into a polytriazine takes place over a period of 5 hours at 230° C in the presence of 0.2% by weight of zinc octoate.

EXAMPLE 13

26.0 g (0.1 mol) of 4,4'-di-N-cyanamido dicyclohexyl methane and 31.8 g (0.1 mol) of bis-1,1-(4-cyanatophenyl)-cyclohexane are boiled under reflux for 3 hours in 150 ml of dichloroethane. A polymer N-cyano-isourea ether is obtained in a quantitative yield following removal of the solvent by distillation. (IR-spectrum:

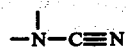

at 4.5 μ; > C=NH at 5.9 μ). Hardening into a polytriazine takes place over a period of 6 hours at 200° C in the presence of 0.2% by weight of zinc octoate.

EXAMPLE 14

31.6 g (0.1 mol) of bis-1,1(4-cyanamidophenyl)-cyclohexane and 31.8 g (0.1 mol) of bis-1,1-(4-cyanatophenyl)-cyclohexane are boiled under reflux for 4 hours in 200 ml of isopropanol. A polymeric N-cyano-isourea ether is obtained in a quantitative yield following removal of the solvent by distillation. IR spectrum; > N-CN at 4.5 μ and > C=NH at 5.9 μ). Hardening of this prepolymer into an extremely hard polytriazine takes place over a period of 5 hours at 220° C in the presence of 0.3% by weight of zinc chloride.

EXAMPLE 15

24.8 g (0.1 mol) of 4,4'-di-N-cyanamido dimethyl methane and 13.3 g (0.066 mol) of 1,3,5-tricyanato benzene are boiled under reflux for 4 hours in 100 mol of isopropanol. A polymeric N-cyano-isourea ether is obtained in a quantitative yield following removal of the solvent by distillation. (IR-spectrum: > N-CN-band at 4.5 μ, > C=NH band at 5.9 μ). Hardening into an extremely hard, brittle polytriazine takes place over a period of 5 hours at 240° C in the presence of 0.2% by weight of zinc octoate.

We claim:
1. A mixture which can be converted into a high molecular weight polymer of polytriazine structure which is substantially insoluble in solvents, the mixture comprising:
A. a cyanamide corresponding to the general formula (I):

in which R represents an aliphatic, cycloaliphatic, heterocyclic or aromatic radical optionally interrupted by at least one oxygen atom, and $n$ is a number from 2 to 5, and B. an aromatic cyanic acid ester corresponding to the general formula (II):

in which Ar represents an aromatic radical or an aromatic radical interrupted by a bridge member and p is a number from 2 to 5.

2. A mixture as claimed in claim 1, which comprises from 30 to 70 mol % of component A and from 70 to 30 mol % of component B.

3. A process for the production of a high molecular weight polymer of polytriazine structure, which comprises reacting a mixture as claimed in claim 1, at an elevated temperature, optionally in the presence of a catalyst to form a prepolymer soluble in organic solvents or a fusible prepolymer (polymeric N-cyanoisourea ether), and allowing the prepolymer to react to completion at an elevated temperature and optionally in the presence of a catalyst to form the desired high molecular weight polymer of polytriazine structure which is substantially insoluble in solvents.

4. A process as claimed in claim 3, wherein the reaction to form the prepolymer is carried out at a temperature of from 30° tp 150° C.

5. A process as claimed in claim 3, wherein the prepolymer at a temperature of from 150° to 350° C.

* * * * *